(12) United States Patent
Warke (10) Patent No.: US 7,801,204 B2
(45) Date of Patent: Sep. 21, 2010

(54) ESTIMATION OF BER PERFORMANCE (75) Inventor: Nirmal C. Warke, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1024 days.

(21) Appl. No.: 11/441,643

(22) Filed: May 26, 2006

(65) Prior Publication Data

US 2007/0274378 A1 Nov. 29, 2007

(51) Int. Cl.
H04B 17/00 (2006.01)
H03H 7/30 (2006.01)
H04W 4/00 (2009.01)

(52) U.S. Cl. ............... 375/225; 375/226; 375/229; 370/338

(58) Field of Classification Search ......... 375/225–226, 375/229; 370/338
See application file for complete search history.

(56) References Cited

U.S. PATENT DOCUMENTS

| 6,678,844 | B2* | 1/2004 | Vandersteen et al. | 714/704 |
| 6,859,902 | B1* | 2/2005 | Dalal et al. | 714/726 |
| 7,505,512 | B1* | 3/2009 | Anderson et al. | 375/229 |
| 2003/0099208 | A1* | 5/2003 | Graziano et al. | 370/286 |
| 2003/0142737 | A1* | 7/2003 | Tarng | 375/225 |
| 2004/0136450 | A1* | 7/2004 | Guenther | 375/226 |
| 2004/0250179 | A1* | 12/2004 | Laquai | 714/699 |
| 2005/0084044 | A1* | 4/2005 | Kokkonen | 375/347 |
| 2005/0090205 | A1* | 4/2005 | Catreux-Erceg et al. | 455/78 |
| 2005/0180369 | A1* | 8/2005 | Hansen et al. | 370/338 |

OTHER PUBLICATIONS

Bilal Ahmad, "Performance Specification of Interconnects", DesignCon 2003 High-Performance System Design Conference, Cisco Systems, Inc., (date unknown).
Palani Subbiah, "Bit-Error Rate (BER) For High-Speed Serial Data Communication", Cypress Semiconductor, Data-Communications Division, (date unknown).
Publication "HFTA-05.0: Statistical Confidence Levels For Estimating BER Probability", Dallas Maxim, Fiber Optic Circuits, www.maxim-ic.com/an703, Oct. 26, 2000, pp. 1-7.
Vladimir Stojanovic and Mark Horowitz, "Modeling and Analysis of High-Speed Links", Stanford University, MARCO Interconnect Focus Center and Rambus, Inc., (date unknown).

* cited by examiner

Primary Examiner—Mohammad H Ghayour
Assistant Examiner—Sarah Hassan
(74) Attorney, Agent, or Firm—Steven A. Shaw; W. James Brady; Frederick J. Telecky, Jr.

(57) ABSTRACT

A method to determine bit error rate (BER) for a given channel of a communication system includes determining a first statistical representation of at least one deterministic source of noise for the given channel. A parametric statistical representation having parameters that model non-deterministic noise is defined for the given channel and values for the parameters of the parametric statistical representation are estimated to provide a second statistical representation for the non-deterministic noise based on at least one of measurements and simulations performed for the given channel. The BER of the given channel is estimated as a function of the first and second statistical representations.

19 Claims, 3 Drawing Sheets

ESTIMATION OF BER PERFORMANCE

TECHNICAL FIELD

The present invention relates to estimation of bit error rate (BER) performance in relation to communication of data over one or more channels.

BACKGROUND

In digital communications, a bit error rate (BER) is utilized to quantify the ratio of erroneous bits detected relative to the number of transmitted bits. BER can be measured for a given communication system by transmitting a known data pattern and observing the number of errors detected over a duration of testing. In practice, however, many communication systems require BER for a given application to be on the order of $1e^{-12}$ or lower. Accordingly, to ensure BER within down to such levels, functional tests often must be performed over extended time periods (e.g., a number of days). For example, given a data rate of approximately 1 giga bits per second (Gbps) would require approximately one day to transmit 100 times $1e^{12}$ bits, which would only afford marginally reasonable level of confidence. If the data rate decreases or if the BER requirement reduces, the time requirements to transmit and measure data during functional testing increase accordingly. Such an extensive time periods to perform functional testing are often inappropriate in many circumstances associated with production and testing of circuit components.

Because of the impractical time requirements associated with performing measurements in bit-by-bit simulations, alternative techniques have been developed to estimate BER. Many of these alternative techniques employ statistical approaches to estimate BER, such as methods using probability distribution functions (PDFs). For example, the overall channel including the transmitter and receiver are modeled linearly, such as being approximated by a linear finite impulse response (FIR) filter. The model can be analyzed to compute filter taps corresponding to intersymbol interference. A similar PDF for crosstalk noise can also be computed. Because of the constraints associated with such statistical approaches, other non-idealities associated with the communication system typically remain unaccounted for. This tends to result in inaccuracies associated with the estimated BER.

SUMMARY

One embodiment of the present invention provides a method to determine bit error rate (BER) for a given channel of a communication system. The method includes determining a first statistical representation of at least one deterministic source of noise for the given channel. A parametric statistical representation having parameters that model non-deterministic noise is defined for the given channel and values for the parameters of the parametric statistical representation are estimated to provide a second statistical representation for the non-deterministic noise based on simulations performed for the given channel. The BER of the given channel is estimated as a function of the first and second statistical representations.

Another embodiment of the present invention provides a system to determine bit error rate (BER) for at least one communication channel. The system includes a parameter estimator that estimates values for unknown parameters of a parametric statistical representation of unknown sources of noise for the communication channel based on a simulated statistical representation of total noise for the communication channel to provide a corresponding statistical representation of the unknown sources of noise for the communication channel. The simulated statistical representation of total noise for the communication channel is derived from time domain simulations performed on the communication channel. An aggregator combines the statistical representation of unknown sources of noise for the communication channel with a statistical representation of at least one known source of noise for the communication channel to provide a total noise statistical representation of the noise for the communication channel. A bit error rate estimator estimates BER for the communication channel as a function of the total noise statistical representation provided by the aggregator.

Another embodiment of the present invention provides a system to determine bit error rate (BER) performance for a communication channel. The system includes means for determining a first statistical representation of at least one deterministic source of noise for the communication channel. The system also includes means for estimating values of unknown parameters of a parametric statistical representation of unknown sources of noise for the communication channel and for providing a second statistical representation of the known sources of noise. The values of the unknown parameters being estimated based on time domain simulations performed for the communication channel. The system also includes means for estimating the BER of the communication channel as a function of the first and second statistical representations.

DETAILED DESCRIPTION

The present invention relates to estimation of bit error rate (BER) for a communication channel. As used herein, the term "BER" corresponds to the number of bit errors transmitted/received divided by the total number of bits transmitted/received. BER thus provides an indication of the quality of communication channel. For example, to provide a BER of $1e^{-12}$, there can be one bit error per $1e^{12}$ bits. At a 1.25 Gbps bit rate, it will take approximately 800 seconds (13.3 minutes) to transmit/receive $1e^{12}$ bits. Therefore, measurements sufficient to ascertain the BER down to $1e^{-12}$ or lower (at a sufficient confidence level) will generally require transmission a greater number of bits than $1e^{12}$ bits. Computer simulations on a system model can also be performed determine BER. However, computer simulations presently can typically run about $1e^6$ bits in about an hour. Many existing applications require BER performance that is down to a level of $1e^{-12}$ or lower (e.g., $1e^{-17}$). Therefore, measurements or computer simulations might impose unacceptable time constraints.

The present invention enables determination of a low BER for a given channel by combining simulations or actual measurements over the channel with statistical analysis. For example, the approach can perform bit-by-bit measurements by sending a known data pattern over a channel to determine a first BER, which significantly higher than the desired low BER. Such measurements can be implemented by artificially increasing one or more noise parameters in the system. In the absence of such induced noise, there likely would not be any bit errors in $1e^7$ or $1e^8$ bits. Thus, as described herein, the extrapolation of BER is performed in the domain of the noise parameter(s) that was artificially increased. For example, a voltage offset for a receiver sense amplifier can be increased to induce additional errors during the measurements and the BER can be estimated down to approximately $1e^{-8}$. Alternatively, simulations can be performed (e.g., on a model of communication system) to estimate the first BER. As mentioned above, when computer simulations are used to estimate BER for a system, there is usually an even greater need to extrapolate the estimated BER down to the desired low BER, according to an aspect of the present invention, than when measurements are employed. It will be understood, however, that the approach described herein is equally applicable to approaches that employ actual measurements and that employ simulations to determine the first BER value. That is, the present invention can be implemented based on actual measurements performed on actual hardware as well as based on computer simulation performed on a model representing such hardware.

According to an aspect of the present invention, statistical representations are generated for known sources of noise (e.g., intersymbol interference and crosstalk). Unknown sources of noise are represented by a parametric statistical representation, with the unknown parameters in the parametric statistical representation being estimated based on the simulations and based on statistical representations of known sources of noise. The BER is then estimated to the desired low BER based on a statistical representation for the total noise, including the known and unknown sources of noise.

Figure 1:
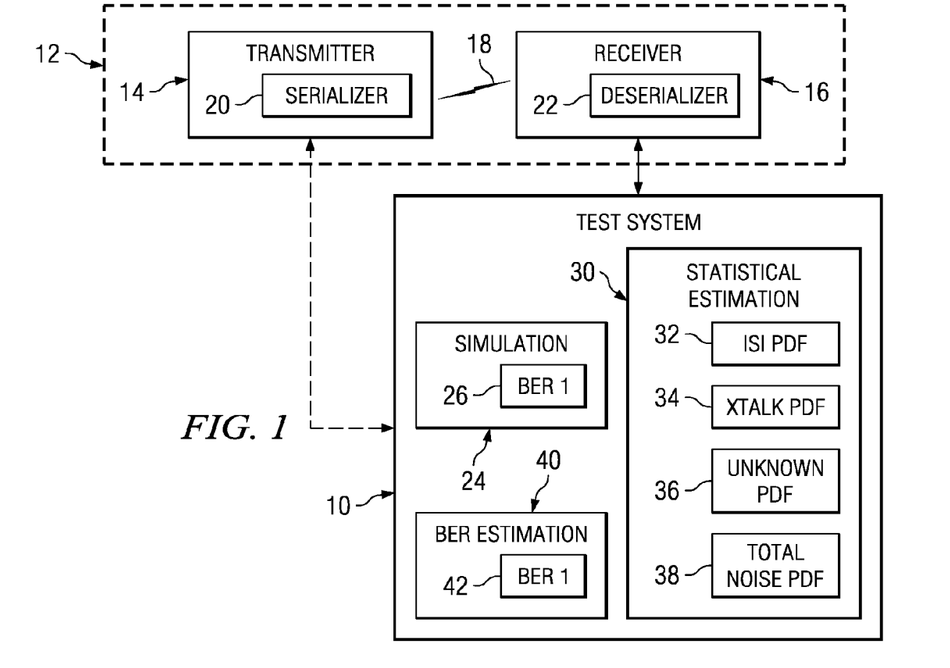
FIG. 1 illustrates an example of a schematic block diagram of a system to estimate BER performance in accordance with an aspect of the invention.

FIG. 1 depicts an example of a test system 10 that can be implemented according to an aspect of the present invention. The test system 10 is programmed and/or configured to ascertain BER performance for one or more communication channel, such as may form part of a communication system 12. The test system 10 can be considered as being or as including a BER tester (BERT).

By way of example, the communication system 12 includes a transmitter 14 and a receiver 16. Each of the transmitter 14 and receiver 16 may be part of a transceiver that includes both a transmitter and receiver. The transmitter 14 and receiver 16 can communicate over a communication link 18. The link 18 may include a wire (e.g., electrically conductive wire or trace, or an optical fiber) or the link can be wireless (e.g., where communication occurs in the absence of a physical transmission medium between the transmitter and receiver). The communication of information between the transmitter 14 and receiver 16 is implemented as digital communication of one or more bits.

As one example, the communication system 12 can be implemented as including a serializer-deserializer (SERDES) system that transmits the data as a serial stream of bits over the communication link 18. The SERDES system includes a serializer 20 in the transmitter 14 and a deserializer 22 in the receiver 16. The serializer 20 can be configured (e.g., including a multiplexer and associated circuitry) to serialize an input data stream that is transmitted over the communication link 18 to a deserializer 22 at the receiver 16. The deserializer 22 receives the serial stream via the communication link 18 and deserializes the stream back to a corresponding parallel signal. For example, the deserializer can include a de-multiplexer that converts the serial data stream received via the communication link 18 to the appropriate format for processing. A typical SERDES system also includes a common path (not shown) that contains clock signals for synchronizing communication between the serializer 20 and deserializer 22 of the respective transmitter and receiver. While the communication system 12 is depicted as being implemented using a SERDES design, it is to be understood and appreciated that the test system 10 can be utilized to determine BER performance in other types of communication architectures.

Errors can be introduced in data that is transmitted between the transmitter 14 and the receiver 16, such as by artificially increasing some noise parameter. The errors, referred to herein as bit errors, can be caused by one or more sources of noise that affect data sent in the communication system 12. As an example, two sources of known noise in the communication system 12 include intersymbol interference (ISI) and crosstalk noise. Intersymbol interference generally describes a distortion of the received signal, which distortion is manifested in the temporal spreading and overlap of individual pulses to the degree that the receiver 16 may be unable to reliably distinguish between changes of state (between individual signal elements). Crosstalk refers to interference from an adjacent communications channel, such as may be due to capacitive, inductive, or conductive coupling from one circuit, part of a circuit, or channel, to another. The combined known sources of noise (intersymbol interference and crosstalk) can be referred to as deterministic sources of noise. Among the various sources of noise in the communication system 12, the deterministic sources of noise (e.g., ISI and crosstalk) tend to be dominant sources of noise.

Other unknown (or non-deterministic) sources of noise can be due to errors in the design components and implementation of the communication link 18 as well as the circuitry of the transmitter 14 and receiver 16. Such unknown noise can be caused by external sources and outside influences, such as power supply noise, electrostatic discharge, and electromagnetic interference, to name a few. Random jitter also corresponds to an unknown noise source. Since many applications have low BER requirements, it is often important to determine BER to ensure that such requirements are met. For purposes of explanation, it will be presumed that a low BER is at least $1e^{-12}$ or lower, although a low BER may be higher than this range for certain applications.

The test system 10 includes a simulation component 24. The simulation component 24 is connected to the communication system 12 to measure and determine the number of errors detected over a test duration. For example, the simulation component 24 includes an error detector that compares the transmitted data and the received data. The simulation component 24 can control the transmitter 14 to transmit a known pattern of bits, which pattern may be randomly (or pseudo-randomly) generated. Alternatively, the pattern may be predefined and known by (e.g., via preprogramming) the simulation component 24. The simulation component 24 determines the BER based on the number of errors detected relative to the number of errors transmitted over a range of simulations performed. The BER can be computed down to an order of magnitude (corresponding to the BER range or level) that depends on the number of bits sent over the communication link 18. When referring to a BER level, it is meant that the BER is determined down to a corresponding negative order of magnitude. The simulation component 24 thus determines the first BER (BER_1) 26 down to a defined BER level. As mentioned above, if the simulation component 24 were to be utilized to determine the BER 26 to a low BER level (e.g., down to $1e^{-12}$ or lower) within an adequate degree of confidence, the simulation process and/or measurements likely would require a test duration of one or more days. According to an aspect of the present invention, the simulation component 24 performs time domain, bit-by-bit functional testing (actual measurements) to estimate the first BER 26 in the presence of non-system non-idealities. Alternatively, the simulation component 24 could implement computer simulations on a model representing such system, including the non-system non-idealities to determine the first BER (BER_1) 26.

For example, assuming a required BER of $1e^{-12}$, the simulation component 24 can calculate the first BER 26 down to approximately $1e^{-5}$ to $1e^{-6}$. The level of the first BER generally will depend on whether actual measurement or computer simulations on a model are employed. Additional measurements or simulations can be performed if it is determined that a lower BER is required to ascertain the BER to the desired low level. As one example, the test duration and number of bits to be transmitted can be set a priori, such a based on a priori information of the communication system. Alternatively, the testing process might remain flexible such that the simulation component 24 can perform testing until an asymptotic state of the estimated BER can be determined from the simulation data. If the asymptotic state is not achieved for the test duration implemented by the simulation component 24, additional testing can be run on the communication system 12 to transmit additional bits over the link 18 for estimating the first BER 26 to a lower level. As one example, the simulation component 24 can perform simulations sufficient to estimate the first BER 26 to a level (e.g., approximately $1e^{-5}$ to $1e^{-6}$) that is one-half or less than the order of magnitude of the required BER (e.g., $1e^{-12}$).

The test system 10 also includes a statistical estimation component 30 that is programmed and/or configured to determine a statistical representation for known sources of noise for the channel 18 in the communication system 12, including ISI and crosstalk. The statistical estimation component 30 determines a statistical representation for the one or more known sources of noise. For instance, the statistical estimation component 30 can determine a probability distribution function (PDF) for each of the ISI and crosstalk, indicated at 32 and 34, respectively. To simplify the estimation of the ISI PDF 32 and the crosstalk PDF 34, the corresponding channel responses for each of ISI and crosstalk are quantized.

By way of further example, the statistical estimation component 30 can construct PDFs for both ISI and crosstalk by approximating such noise as linear filters. ISI and crosstalk for the given channel can be considered as the output of a linear filter whose inputs are M-PAM symbols, where M is a positive integer denoting the number of symbols. As one example, the noise (ISI or crosstalk) can be expressed as follows:

$$\text{Noise} = \sum_{i=1}^{N} f(i) * x(i) \qquad \text{Eq. 1}$$

where f(i) are the ISI taps or crosstalk coupling response taps, x(i) corresponds to the M-PAM symbols, and N is the number of filter taps used represent the noise.

Since there are N filter taps and M possible input symbol values, there are a total of $M^N$ possible discrete outputs. Further assuming that the input symbols are equiprobable, each of these values occurs with a probability of $1/M^N$. Typically, N is reasonably large (about 100) and even for 2-PAM, $2^N$ can become prohibitively large.

In order to reduce the complexity associated with the computations for EQ. 1, the filter response can be quantized to small number (e.g., 500) of values based on a linear array. For instance, the values can be denoted by g(i), where i=1, . . . , 500. Further, let n(i) denote the number of filter taps that are quantized to the filter value g(i). Assuming that all the filter inputs are independent, the PDF of the sum of the n(i) terms corresponding to value g(i) is the convolution of the individual PDFs. Further assuming that the input symbols are equiprobable, each PDF has M terms equal to 1/M.

The spacing between adjacent values of the PDF corresponding to g(i) is 2*g(i) or in other words there are 2*g(i) zero entries between every two nonzero entries of the PDF. In order to combine the PDFs for the g(i) terms (where i=1, . . . , 500), it should be noted that the values g(i) are chosen to lie on a linear array. In this way, the PDFs for different values of g(i) can be convolved in a straightforward manner to construct the ISI PDF 32 and the crosstalk PDF 34. An aggregate statistical PDF for the known sources of noise (e.g., the deterministic noise) thus can be determined by convolving the ISI PDF 32 and the crosstalk PDF 34, such as determined above. Those skilled in the art will understand and appreciate other approaches that can be utilized to determine the PDF for ISI and the PDF for crosstalk. Additionally, other known sources of noise can also be statistically represented as a PDF in a similar fashion such that a total known sources of noise can be ascertained by convolving the respective PDFs.

The statistical estimation component 30 also is programmed to determine a parametric statistical representation (e.g., a PDF) for unknown sources of noise due to non-idealities of the system 12. The parametric PDF 36 can be approximated as an Nth order distribution, where N is an integer greater than or equal to 2. The parametric PDF 36 can be predefined as including unknown parameters that vary according to what order function is employed to approximate the parametric PDF for unknown noise sources. As one example, the PDF for known sources of noise, PDF_n(x), can be represented as a fifth order function as follows:

$$\text{PDF\_}n(x) = K1 * \exp(A1*x + A2*x^2 + A3*x^3 + A4*x^4 + A5*x^5) \qquad \text{Eq. 2}$$

where K1, A1, A2, A3, A4 and A5 are parameters of the PDF representing the unknown sources of noise, and x corresponds to the input symbols.

The statistical estimation component 30 determines an aggregate statistical representation of noise by combining the ISI PDF 32, crosstalk PDF 34 and the parametric PDF 36 for the unknown sources of noise (e.g., from EQ. 2). The PDFs can be combined by convolving the respective PDFs, assuming that the sources of noise represented by the PDFs are independent and are appropriately scaled. The statistical estimation component 30 can employ a parameter estimator that estimates values for the parameters in the parametric PDF 36. The parameter estimation, for instance, can estimate parameter values by substantially matching the total noise PDF (which includes the parametric PDF) with a corresponding PDF of actual noise that is derived based on the data obtained by the simulation component 24.

Those skilled in the art will understand various approaches that can be utilized to estimate the parameters of the parametric PDF 36. For example, various types of Bayesian parameter estimation techniques exist, including minimum-mean square error (MMSE) estimation, minimum mean-absolute error (MMAE) estimation, maximum a posteriori probability estimation. Other types of parameter estimation may also be used, including sufficient statistics, minimum-various unbiased estimation, maximum likelihood estimation, and Cramer-Rao lower bound estimation, to name a few.

By way of further example, the parameter estimation may be performed based on a MMSE fit in which a minimum error between the total noise PDF (an aggregate of the PDFs 32, 34 and 36) and the PDF derived from the bit-by-bit simulations. The estimation further can be determined over a subset of the simulated range or BER level. It will be understood and appreciated that the values of the parameters may be estimated with increased accuracy where the parameter estimation is performed over a larger subset of the simulated range. Therefore, the desired level of accuracy for determining the low BER can be balanced with the time constraints associated with performing the time domain measurements or simulations on the communication channel.

With the parameter values determined by the statistical estimation component 30, the test system 10 includes a BER estimation component 40 that is programmed to compute a low BER value (BER_2) as a function of the ISI PDF 32, the crosstalk PDF 34 and PDF 36 for the unknown sources of noise. As mentioned herein, a total noise PDF 38 can be estimated by convolving the respective PDFs 32, 34 and 36, after the values of unknown parameters have been applied to the PDF 36 for the unknown sources of noise (e.g., no longer being a parametric PDF). The total noise PDF 38 can be utilized to estimate the BER 42 down to the required low level (e.g., $1e^{-12}$ or lower). It is to be understood and appreciated that the second BER 42 is determined based on a combination of time domain measurements or simulations and statistical analysis of the noise for the given channel.

As an example, the BER estimation component 40 can perform such estimation by performing curve fitting of the BER based on the total noise PDF 38. Those skilled in the art will understand and appreciate various curve fitting methods (e.g., least square fit method) and other estimation techniques that can be utilized by the BER estimation component 40 to estimate the BER 42 down to the required level. For instance, since the BER is the integral of the noise PDF, the BER estimation component 40 can extrapolate down from the integral of the total noise PDF 38 to estimate the BER 42 according any one of various types of curve fitting techniques. Accordingly, the aggregate noise PDF can be quantized and curve fitting such as the least square fit method can be employed to extrapolate the BER such as by extrapolating the BER bathtub curve By way of further example, the BER estimation component 40 can estimate the BER 42 by determining a BER bathtub curve from the total noise PDF 38 and then extrapolating down to the desired BER range (e.g., approximately to $1e^{-12}$ to $1e^{-15}$) at the center of the eye. A curve fit to this characteristic provides an extrapolation of the BER. Another approach is to extrapolate the BER bathtub curve by first extrapolating the BER in an orthogonal direction, such as may be implemented by extrapolating a corresponding BER versus voltage sensitivity curve to a multivariable equation that defines a log of the total noise PDF 38. A corresponding "extrapolated" BER bathtub curve can be reconstructed from the curve that fits the multivariable equation at the specified voltage sensitivity. Those skilled in the art may appreciate other approaches that can be employed to estimate a low BER 42 based on the total noise PDF, according to an aspect of the present invention.

Figure 2:
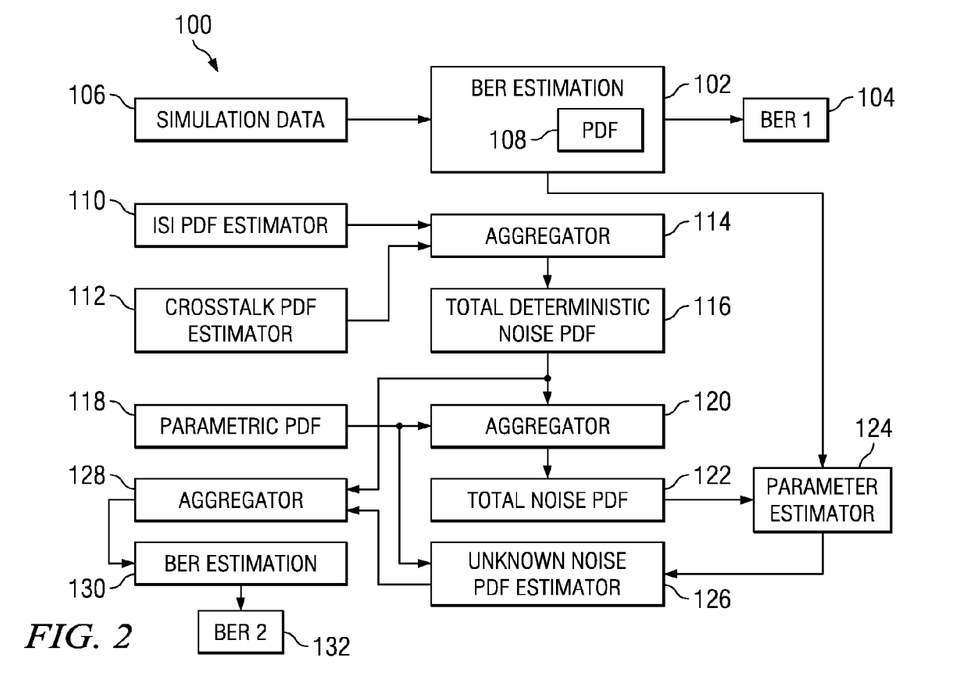
FIG. 2 is a block diagram of a system to estimate BER performance in accordance with an aspect of the invention.

FIG. 2 depicts an example of a BER estimation system 100 that can be implemented according to an aspect of the present invention. The system 100 can be implemented as a computer-executable instructions running on one or processors, which may be in a computer system. Alternatively, the system 100 can be instantiated on die, such as in one or more integrated circuits that form part of a communication system. The system 100, for example, can be employed during an initial training process to determine BER of communications channel based on which a corresponding data rate can be established or adjusted. Additionally, BER performance can be periodically or otherwise intermittingly determined during operation.

The BER estimation system 100 includes a BER estimation component 102 estimates BER performance to a first BER range, indicated at 104. The BER estimation component 102 estimates the BER 104 based on simulation data 106. The simulation data 106 corresponds to real time data for a given communication channel having system non-idealities, which data may include transmitted data and received data. The BER estimation component 102 thus can estimate the BER 104 based on a comparison of the transmitted and received data, as defined by the simulation data 106. As described herein, the simulation data 106 may be obtained in real time such as by measurements during a testing process or otherwise obtained intermittently by sending test signals during operation. As another example, the simulation data 106 can be generated during a manufacture testing process to determine whether a design meets desired BER requirements. The BER estimation component 102 can also construct a PDF of the noise for use by the BER estimation system 100, as described herein.

The system 100 also includes an ISI PDF estimator 110 that estimates a PDF for ISI associated with the given channel. The system 100 also includes a crosstalk PDF estimator 112 that estimates a PDF for crosstalk for the given channel. An example approach for estimating ISI and crosstalk PDFs is described herein. Those skilled in the art will understand and appreciate that other approaches can also be utilized to estimate such PDFs. An aggregator 114 combines the PDFs of ISI and crosstalk to construct a total deterministic noise PDF 116. For instance, the aggregator 116 convolves the PDFs for ISI and crosstalk to generate the total deterministic noise PDF 116. The combining of such PDFs assumes that the respective noise for ISI and crosstalk are independent and scaled appropriately to facilitate such convolution.

The system 100 also includes a parametric PDF 118 that defines non-deterministic sources of noise for the given channel (e.g., a Nth order PDF as described herein). Another aggregator 120 combines the total deterministic noise PDF. It is to be understood that a portion noise PDF 118 to provide a corresponding total noise PDF. It is to be understood that a portion of the total noise PDF is parametric due to the unknown parameters associated with the parametric PDF 118 for the unknown sources of noise. A parameter estimator 124 estimates values for the unknown parameters in the corresponding parametric PDF 116 (corresponding to part of the total noise PDF 116) as a function of the total noise PDF and the PDF 108 derived from the bit-by-bit measurements or simulations on the given channel. Those skilled in the art will understand and appreciate various types of parameter estimation techniques that can be utilized to estimate the parameters of the parametric PDF based on the teachings contained herein.

An unknown noise PDF estimator 126 can apply the estimated parameter values (from the parameter estimator 124) to populate the parametric PDF 118 and thereby convert the parametric PDF to a corresponding non-parametric PDF representing the unknown sources of noise. An aggregator 128 combines the non-deterministic noise PDF with the total deterministic noise PDF 116 (e.g., by convolution) to provide a corresponding total noise PDF for the given channel, indicated at 129. A second BER estimator 130, in turn, can estimate a second BER value 132 to a desired BER range based on the total noise PDF 129. For instance, the BER estimator 130 can employ extrapolation or other curve fitting techniques to determine the BER of the given channel down to the desired BER range.

It is to be understood and appreciated that the use of statistical analysis and the measurements or simulation combined in the manner described herein afford increased accuracy in estimating BER performance as well as reduces the time relative to conventional simulations. Thus, the approach described herein enables BER performance to be ascertained to a level that may be required to ensure adequate BER performance in many data communication systems.

Figure 3:
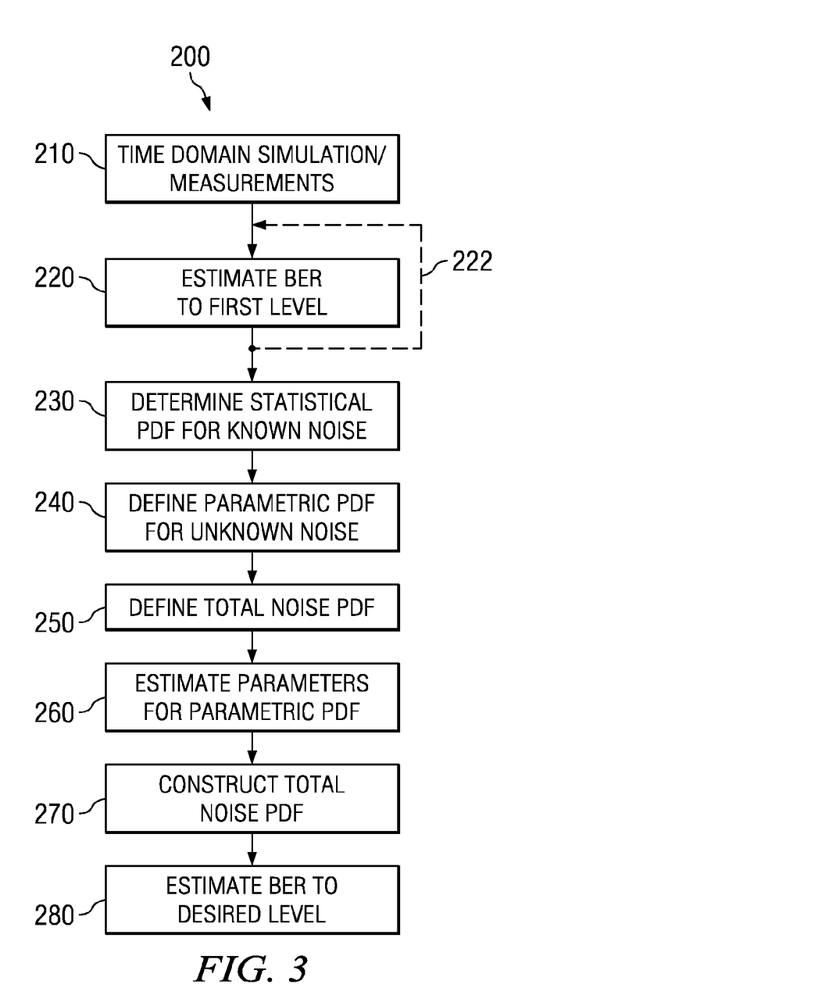
FIG. 3 is a flow diagram of a design method that employs BER estimation in accordance with an aspect of the invention.

In view of the foregoing structural and functional features described above, certain methods will be better appreciated with reference to FIG. 3. It is to be understood and appreciated that the illustrated actions, in other embodiments, may occur in different orders and/or concurrently with other actions. Moreover, not all features illustrated in FIG. 3 may be required to implement a method. It is to be further understood that the following methodology can be implemented in hardware (e.g., instantiated on an IC chip, automatic test equipment, a computer or a computer network), software (e.g., stored in a computer readable medium or as executable instructions running on one or more microprocessors), or as any combination of hardware and software.

FIG. 3 depicts a flow diagram of a method 200 that can be employed to determine BER for a given communication channel according to an aspect of the present invention. The method 200 begins at 210 with performing time domain, bit-by-bit simulation for a given channel. In this context, such simulation can include transmitting known data over the given channel and detecting errors in the received data. Such simulations at 210 can alternatively include computer simulations on a model of the channel in which simulated data is transmitted and received on a system model representing the given channel. The simulation at 210 can be run for a predetermined test duration, such as may be determined according to a data rate and a required BER for the given channel (e.g., determined a priori). Alternatively, the simulation at 210 can be run and periodically the BER estimated to determine if the BER has reached an asymptotic behavior. If the BER is determined at 220 to be asymptotic, the simulations can be terminated and the method proceeds to 230. Alternatively, if it is determined that the BER as a function of the simulation data is not asymptotic at its tail, additional simulations can be performed (indicated by dashed line 222) such as to enable BER to be determined to a lower BER level; although, the lower BER level is still higher than the required BER performance for the channel.

At 230, a statistical PDF for known sources of noise is determined. The statistical PDF can statistically represent ISI and crosstalk noise for a given channel. At 240, a parametric PDF is defined to represent unknown sources of noise for a given channel. The parametric PDF can be an Nth order PDF, where N is an integer greater than or equal to 2, having unknown parameters. It would be understood and appreciated that the accuracy of the parametric PDF, at least in part, will depend on the extent and type of the simulations performed at 210. For instance, if an insufficient amount of simulations are performed such that the BER estimated at 220 is not sufficiently accurate within a desired confidence level (e.g., BER has not reached an asymptotic behavior at its tail), the values of parameters determined for the parametric PDF might include such inaccuracies. In contrast, if the bit-by-bit simulations are performed to a sufficient degree of confidence to provide the BER at 220 to reach a substantial asymptotic behavior, the unknown parameters of the parametric PDF may be determined with increased accuracy. Those skilled in the art will understand and appreciate thus that the extent of the bit-by-bit simulations can be determined empirically for a given channel based upon design considerations and the required BER performance.

At 250, a total noise PDF is defined. The total noise PDF can be a combination of the statistical PDF of known noise (at 230) and the parametric PDF defined at 240, which parametric PDF includes unknown parameters. At 260, the unknown parameters of the parametric PDF (at 240) are estimated based on the total PDF defined at 250 relative to a PDF of the simulated BER as determined at 220. Those skilled in the art will understand and appreciate various parameter estimation techniques that can be utilized to estimate the parameter values for the parametric PDF.

At 270, a total noise PDF is constructed based on the statistical PDF of known noise determined at 230 and the parametric PDF adding the values determined at 260 being applied. At 280, the BER estimated to the required or desired levels. The estimation at 280 can be implemented as a curve fitting technique, such as at the tail end of the BER curve. Those skilled in the art will understand and appreciate various curve fitting techniques and extrapolation methods that can be utilize to estimate the BER to the desired level at 280.

Figure 4:
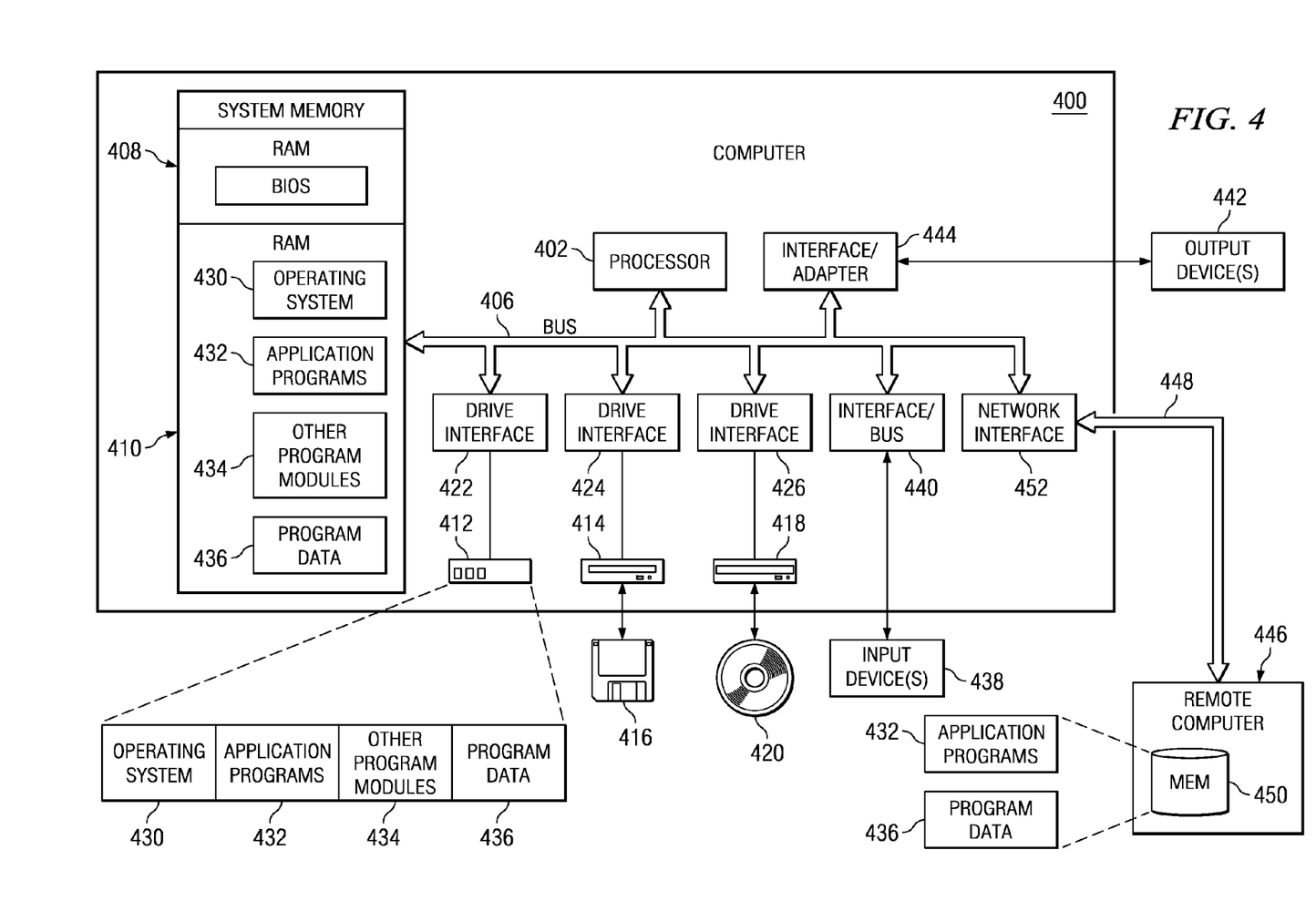
FIG. 4 illustrates an example of a computer system that can be programmed to perform BER estimation in accordance with an aspect of the invention.

FIG. 4 illustrates a computer system 400 that can be employed to execute one or more embodiments employing computer executable instructions. The computer system 420 can be implemented on one or more general purpose networked computer systems, embedded computer systems, routers, switches, server devices, client devices, various intermediate devices/nodes and/or stand alone computer systems. Additionally, the computer system 420 can be implemented on as part of a test system, such as automatic test equipment (ATE), which may be a stand alone type system or be implemented, wholly or in part, on one or more computer.

The computer system 400 includes a processing unit 402, a system memory, and a system bus 406 that couples various system components including the system 404 memory to the processing unit 402. Dual microprocessors and other multiprocessor architectures also can be used as the processing unit 402. The system bus 406 may be any of several types of bus structure including a memory bus or memory controller, a peripheral bus, and a local bus using any of a variety of bus architectures. The system memory includes read only memory (ROM) 408 and random access memory (RAM) 410. A basic input/output system (BIOS) can reside in memory containing the basic routines that help to transfer information between elements within the computer system 400.

The computer system 400 can includes a hard disk drive 412, a magnetic disk drive 414, e.g., to read from or write to a removable disk 416, and an optical disk drive 418, e.g., for reading a CD-ROM disk 420 or to read from or write to other optical media. The hard disk drive 412, magnetic disk drive 414, and optical disk drive 418 are connected to the system bus 406 by a hard disk 414 drive interface 422, a magnetic disk drive interface 424, and an optical drive interface 426, respectively. The drives and their associated computer-readable media provide nonvolatile storage of data, data structures, and computer-executable instructions for the computer system 400. Although the description of computer-readable media above refers to a hard disk, a removable magnetic disk and a CD, other types of media which are readable by a computer, such as magnetic cassettes, flash memory cards, digital video disks and the like, may also be used in the operating environment, and further that any such media may contain computer-executable instructions.

A number of program modules may be stored in the drives and RAM 410, including an operating system 430, one or more application programs 432, other program modules 434, and program data 436. For example, the application programs 432 can include computer-executable instruction for performing a method of determining BER performance, such as according to the teachings contained herein (e.g., the method 200 of FIG. 3). The program data 436 thus can include simulation data and stored intermediate and final values, as may be need to perform such methods.

A user may enter commands and information into the computer system 400 through one or more input device 438, such as a keyboard, a pointing device (e.g., a mouse), a microphone, a joystick, a game pad, a scanner, or the like. Additionally, one or more other input devices 438 may include a communication circuitry (e.g., SERDES circuitry) that is being tested by corresponding BER test programs running on the computer system 400. These and other input devices can be connected to the processor unit 402 and other parts of the computer system 400 through a corresponding port interface 440, which is coupled to the system bus 406, but may be connected by other interfaces, such as a parallel port, a serial port or a universal serial bus (USB). One or more output device(s) (display device printers etc.) 442 also can be connected to the system bus 406 via an interface, such as an interface adaptor 444.

The computer system 400 may operate in a networked environment using logical connections 448 to one or more remote computers, such as a remote computer 446. The remote computer 446 may be a workstation, a computer system, a router, a peer device or other common network node, and typically includes many or all of the elements described relative to the computer system 400. The logical connections can include a local area network (LAN) and a wide area network (WAN), which may be a wired or wireless link.

When used in a LAN networking environment, the computer system 400 can be connected to the local network 451 through a network interface or adapter 452. When used in a WAN networking environment, the computer system 400 can include a modem, or can be connected to a communications server on the LAN. In a networked environment, program modules depicted relative to the computer system 400, or portions thereof, may be stored in the remote memory 450 of the remote computer 446, such as including application programs 432 and program data 436.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A computer readable medium configured to execute instructions for a method to determine bit error rate (BER) for a given channel of a communication system, the method comprising:

determining a first statistical representation of at least one deterministic source of noise for the given channel;

defining a parametric statistical representation having parameters that model non-deterministic noise for the given channel;

estimating values for the parameters of the parametric statistical representation to provide a second statistical representation for the non-deterministic noise based on at least one of measurements or simulations performed for the given channel; and estimating the BER of the given channel as a function of the first and second statistical representations; and performing the measurements on the given channel to estimate a second BER for the given channel based on a comparison of data transmitted and received over the given channel, the second BER being estimated to a level of accuracy that is higher than the BER estimated as a function of the first and second statistical representations.

2. The computer readable medium of claim 1, wherein the level of accuracy of the second BER is estimated to a level that is at least an order of magnitude higher than the level of accuracy of the BER estimated as a function of the first and second statistical representations.

3. The computer readable medium of claim 1, wherein the determining of the first statistical representation further comprises:

determining a statistical probability distribution function (PDF) for intersymbol interference associated with the given channel; and determining a statistical PDF for crosstalk noise associated with the given channel, the statistical PDF for intersymbol interference being combined with the statistical PDF for crosstalk noise to provide a corresponding PDF that represents deterministic sources of noise for the given channel.

4. The computer readable medium of claim 3, wherein the parametric statistical representation comprises an Nth order parametric statistical PDF, where N is a positive integer greater than or equal to 2, the Nth order parametric statistical PDF being combined with the corresponding PDF to provide a total noise PDF for the given channel.

5. The computer readable medium of claim 4, wherein the values for the parameters of the Nth order parametric statistical PDF are estimated by matching the total noise PDF for the given channel with a PDF determined based on the at least one of measurements or simulations performed for the given channel.

6. The computer readable medium of claim 4, the method further comprising:

determining a simulation PDF for errors detected based on the at least one of measurements or simulations performed for the given channel to estimate a second BER that defines a BER range; and the parameters of the Nth order parametric statistical PDF being estimated by comparing the total noise PDF for the given channel with the simulation PDF over a subset of the BER range.

7. The computer readable medium of claim 1, the method further comprising aggregating the first statistical representation with the second statistical representation to provide a total noise statistical representation, the estimation of the BER of the given channel being determined down to a desired BER level by extrapolation based on the total noise statistical representation.

8. The computer readable medium of claim 1, wherein the given channel comprises serialization-deserialization (SERDES) circuitry that communicates data serially over a communication link.

9. A system to determine bit error rate (BER) for at least one communication channel, the system comprising:

a parameter estimator that estimates values for unknown parameters of a parametric statistical representation of unknown sources of noise for the communication channel based on a simulated statistical representation of total noise for the communication channel to provide a corresponding statistical representation of the unknown sources of noise for the communication channel, the simulated statistical representation of total noise for the communication channel being derived from at least one of time domain measurements and simulations performed on the communication channel;

an aggregator that combines the statistical representation of unknown sources of noise for the communication channel with a statistical representation of at least one known source of noise for the communication channel to provide a total noise statistical representation of the noise for the communication channel; and a bit error rate estimator that estimates BER for the communication channel as a function of the total noise statistical representation provided by the aggregator, estimator further operable to estimate a second BER for the given channel based on a comparison of data transmitted and received over the given channel, the second BER being estimated to a level of accuracy that is higher than the BER estimated as a function of the first and second statistical representations.

10. The system of claim 9, further comprising:

a deterministic noise estimator that determines the statistical representation of the at least one known source of noise for the communication channel; and a second aggregator that combines the statistical representation of at least one known source of noise for the communication channel with the parametric statistical representation of unknown sources of noise for the communication channel to provide a total noise statistical representation of noise for the communication channel, which total noise statistical representation includes the unknown parameters of the parametric statistical representation, the parameter estimator estimating the values of the unknown parameters as a function of the simulated statistical representation of total noise for the communication channel and the total noise statistical representation of noise for the communication channel.

11. The system of claim 10, wherein the at least one known source of noise for the communication channel comprises intersymbol interference and crosstalk noise, such that the statistical representation of the at least one known source of noise includes a statistical representation of the intersymbol interference and a statistical representation of the crosstalk noise for the communication channel.

12. The system of claim 11, wherein the deterministic noise estimator further comprises:

an intersymbol interference probability distribution function (PDF) estimator that determines a PDF of intersymbol interference for the communication channel; and a crosstalk PDF estimator that determines a PDF of crosstalk noise for the communication channel, the parametric statistical representation of unknown sources of noise for the communication channel comprising an Nth order parametric PDF of the unknown sources of noise, where N is a positive integer greater than or equal to two denoting the order of the parametric PDF.

13. The system of claim 11, wherein the simulated statistical representation of total noise for the communication channel comprises a simulation PDF derived from a range of the at least one of time domain measurements and simulations performed on the communication channel, the parameter estimator estimating the values of the unknown parameters as a function of the total noise statistical representation for the communication channel relative to a subset of the range provided by the simulation PDF for the communication channel.

14. The system of claim 10, wherein the communication channel comprises serialization-deserialization circuitry such that the simulations correspond to bit-by-bit measurements for data communicated over the communications channel.

15. A system to determine bit error rate (BER) performance for a communication channel, comprising:

means for determining a first statistical representation of at least one deterministic source of noise for the communication channel;

means for estimating values of unknown parameters of a parametric statistical representation of unknown sources of noise for the communication channel and for providing a second statistical representation of the known sources of noise, the values of the unknown parameters being estimated based on at least one of time domain measurements and simulations performed for the communication channel; and means for estimating the BER of the communication channel as a function of the first and second statistical representations and estimating a second BER for the given channel based on a comparison of data transmitted and received over the given channel, the second BER being estimated to a level of accuracy that is higher than the BER estimated as a function of the first and second statistical representations.

16. The system of claim 15, wherein the first statistical representation of at least one deterministic source of noise for the communication channel comprises an intersymbol interference probability distribution function (PDF) for the communication channel and a PDF of crosstalk noise for the communication channel, the means for estimating values determines values of a parametric PDF corresponding to the parametric statistical representation of unknown sources of noise for the communication channel.

17. The system of claim 15, further comprising means for performing at least one of time domain measurements and simulations on the communication channel to estimate the BER to a first level that is higher than the BER estimated by the means for estimating.

18. The system of claim 15, further comprising means for aggregating the first and second statistical representations to provide a total noise statistical representation corresponding to both known sources of noise and to unknown sources of noise for the communication channel, the means for estimating the BER determining the BER for the communication channel from the total noise statistical representation.

19. The system of claim 15, wherein the communication channel comprises serialization-deserialization circuitry.

* * * * *